US010421180B2

(12) United States Patent
Rix

(10) Patent No.: US 10,421,180 B2
(45) Date of Patent: Sep. 24, 2019

(54) SECURITY SYSTEM FOR FASTENERS

(71) Applicant: Zachary Daniel Rix, Fresno, CA (US)

(72) Inventor: Zachary Daniel Rix, Fresno, CA (US)

( * ) Notice: Subject to any disclaimer, the term of this patent is extended or adjusted under 35 U.S.C. 154(b) by 430 days.

(21) Appl. No.: 14/878,114

(22) Filed: Oct. 8, 2015

(65) Prior Publication Data

US 2016/0101511 A1 Apr. 14, 2016

Related U.S. Application Data

(60) Provisional application No. 62/061,814, filed on Oct. 9, 2014.

(51) Int. Cl.

| | |
|---|---|
| ***B23Q 3/00*** | (2006.01) |
| ***B25D 1/16*** | (2006.01) |
| ***B25B 27/04*** | (2006.01) |
| *B25B 19/00* | (2006.01) |

(52) U.S. Cl.
CPC ................ *B25D 1/16* (2013.01); *B25B 27/04* (2013.01); *B25B 19/00* (2013.01)

(58) Field of Classification Search
CPC .... B23Q 3/00; B23Q 3/10; B23Q 7/06; B25B 27/00; B21J 7/00; B21J 7/20; B21J 9/10
See application file for complete search history.

(56) References Cited

U.S. PATENT DOCUMENTS

| | | | | |
|---|---|---|---|---|
| 3,875,644 A * | 4/1975 | Simpson | B25B 27/02 | 29/254 |
| 5,875,534 A * | 3/1999 | Jackson | B25B 27/02 | 29/255 |
| 6,880,217 B2 * | 4/2005 | Garst | B25B 27/0028 | 29/235 |
| 9,844,866 B2 * | 12/2017 | Langdon, Jr. | B25D 17/00 | |
| 2016/0101511 A1 * | 4/2016 | Rix | B25B 27/04 | 29/426.5 |

* cited by examiner

*Primary Examiner* — Lee D Wilson

(74) *Attorney, Agent, or Firm* — R. Scott Kimsey, Esq.; Klein DeNatale Goldner

(57) ABSTRACT

A security system for fasteners includes a plug configured to be received by a fastener so that the fastener cannot be manipulated by a tool in the usual manner. A magnetic insertion tool may be used to seat the plug. A removal tool includes an extraction head configured to mate with the plug so that the plug can be removed when it is necessary or desirable to manipulate the fastener. A slide hammer assembly may provide the necessary force to unseat the plug.

10 Claims, 7 Drawing Sheets

SECURITY SYSTEM FOR FASTENERS

RELATED APPLICATIONS

This Application claims priority to U.S. Provisional Patent Application No. 62/061,814, filed Oct. 9, 2014 and entitled "Security System for Fasteners," which application is incorporated herein by reference in its entirety.

BACKGROUND

1. Field

The present device and system relate generally to a system for securing fasteners, and more specifically to a security plug and insertion and removal tools for preventing unwanted manipulation of fasteners such as those used to secure utility boxes.

2. Background

Fasteners are used in a variety of circumstances in which secure access to an enclosure is important. One example includes utility boxes, which are used to house components of utility infrastructure including, but not limited to, electrical, telecommunication, fiber optic, water, and other related utilities. Preventing unauthorized access to utility boxes is of paramount importance.

A number of attempts have been made at designing utility boxes such that they are more difficult to access without proper authorization. These attempts may include changes to the design of the utility boxes themselves and/or the use of secure fasteners. Changing the design of the utility box requires replacement of existing boxes to achieve the desired level of security across all utility boxes. Secure fasteners may be used with existing boxes, but may still be accessible to unauthorized entry because the secure fastener is often exposed.

SUMMARY

One aspect of the present device and system includes a plug configured to be received by a fastener, wherein when the plug is in place the fastener cannot be manipulated by a tool in the usual manner.

Another aspect of the present device and system includes a magnetic insertion tool for placing the plug in the proper position prior to insertion, particularly when the fastener being secured is positioned in a location that is difficult to access due to the surrounding structure of the box or other structure being secured.

Another aspect of the present device and system includes a removal tool configured to mate with an end of the plug so that the plug can be removed from a fastener when it is necessary or desirable to manipulate the fastener.

A system for securing a fastener against unwanted tampering may include a plug configured to engaged the head of the fastener to be secured. The plug may have an external profile that allows engagement of the plug with an extraction tool. The extraction tool may have a first end and a second end, with the first end of the extraction tool configured to mate with the external profile of the plug in such a way as to allow the extraction tool to exert a pulling force on the plug. A slide hammer assembly may be removably attached to the second end of the extraction tool. The slide hammer assembly may include a slide bolt having a shaft and a stop at a first end thereof. A weight may be slidingly disposed on the shaft of the slide hammer assembly. Movement of the weight along the shaft of the slide bolt to impact the stop creates a force on the hammer shaft and extraction tool that is sufficient to pull the plug from the fastener.

The plug may include a head, a base, and a shaft extending between the head and the base. The base of the plug may be configured to be received within the opening in the fastener. The shaft of the plug may have a smaller diameter than that of the head of the plug at the point where the shaft and head of the plug meet.

The head of the plug may have a sloping profile.

The first end of the extraction tool may include an extraction head. The extraction head may include an opening sized and shaped to receive the head of the plug. The extraction head may also include a flange configured to securely engage the head of the plug such that a pulling force exerted on the extraction tool results in a corresponding pulling force on the plug.

A system for securing a fastener against unwanted tampering may alternatively include a plug configured to be received by a fastener to be secured. An extraction tool may be provided having a first end, a second end, and a shaft extending between the first and second ends. The first end of the extraction tool may include an extraction head configured to engage the plug. The second end of the extraction tool may include a stop. A weight may be slidingly disposed on the shaft of the extraction tool. Impacting the stop of the extraction tool with the weight creates a pulling force that allows the extraction tool to remove the plug from the fastener.

Seating the plug within the head of the fastener may be accomplished using an insertion tool having a shaft with a magnet attached to one end thereof. The magnet retains the plug while the plug is inserted into the head of the fastener.

The pulling force for unseating the plug from the head of a fastener may be provided via a slide hammer weight impacting the stop of the slide hammer.

The head of the fastener being secured may have a non-standard configuration, and the plug may be configured with a complementary configuration that allows the plug to be seated within the head of the fastener.

DETAILED DESCRIPTION

Figure 1:
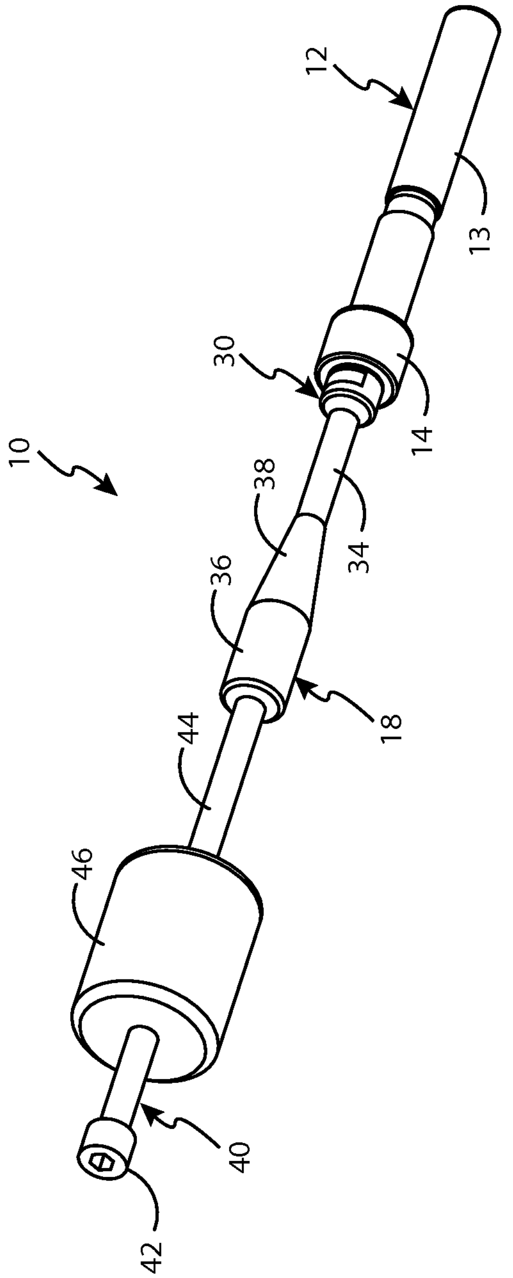
FIG. 1 is a perspective view of one embodiment of a device and system for securing a fastener.

Turning now to the drawings, wherein like numeral indicate like parts, the numeral 10 refers to a fastener and associated fastener security device and extraction system, as set forth herein. Bolt 12 shown in FIG. 1 is an exemplary fastener having a bolt body 13 and a bolt head 14 with an opening 26 therein (best seen in FIG. 4). The fastener security device extraction system includes an extraction tool 18, plug 16, and slide hammer assembly 40. Although bolt 12 is used as an example in the figures, it is contemplated that any type of bolt or any other suitable fastener may be used in conjunction with the present device and system, and the numeral 12 may be used herein to refer to bolt 12 alternately as a bolt or fastener. Bolt 12 may be designed with a specific head configuration to accommodate plug 16, or plug 16 may be configured for use with existing bolts or fasteners.

Figure 2:
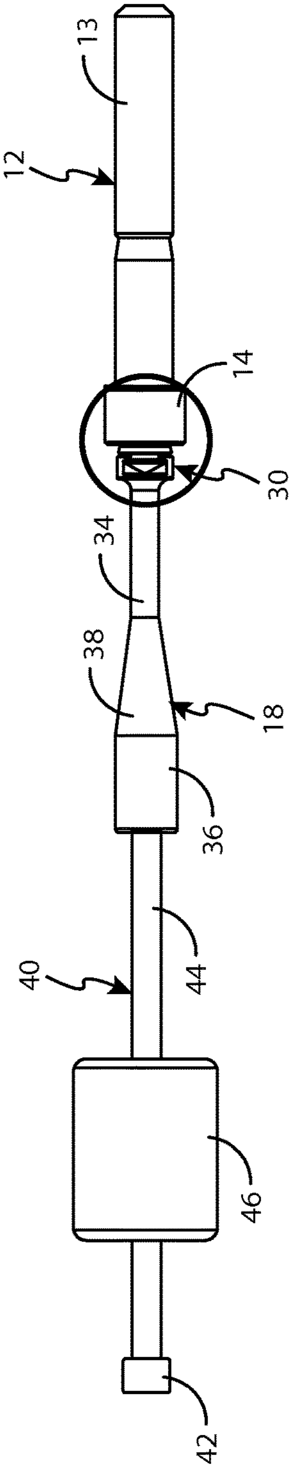
FIG. 2 is a side view of the device and system of FIG. 1.
Figure 3:
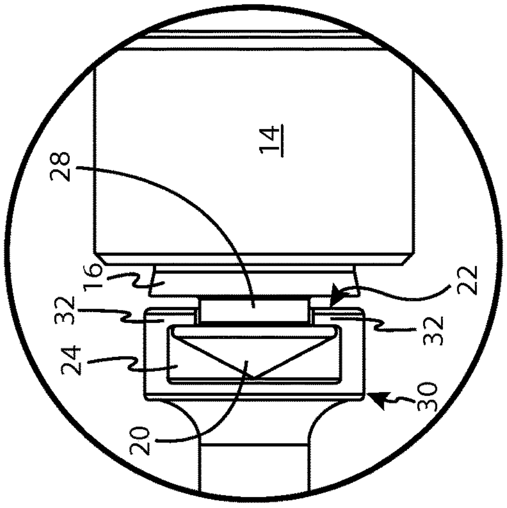
FIG. 3 is a close view of the engagement between a plug and extraction tool of the present system.

As best shown in FIGS. 2 and 3, a plug 16 may be inserted into an opening 26 in the head of bolt 12. Opening 26 is the opening typically used to engage bolt 12 using an appropriate tool, so that bolt 12 can be tightened, loosened, or removed. The presence of plug 16 within opening 26 makes it impossible for bolt 12 to be manipulated in the usual manner. Plug 16 includes a head 20, a body 21, and a shaft 28 extending between the body 21 and head 20 of plug 16. Shaft 28 has a smaller diameter than head 20 at the point where head 20 and shaft 28 meet, thereby providing an annular indentation that can be used by a removal tool to grasp plug 16. Plug 16 has an external profile that makes it difficult to manipulate plug 16 without a specialized tool. For example, head 20 of plug 16 may be sloped as shown in FIG. 3 in order to make it more difficult to grasp or otherwise manipulate plug 16. Other external profiles of head 20 may also be used. Plug 16 may have any suitable external profile that allows removal of plug 16 with a specialized tool, but restricts or makes more difficult removal of plug 16 without the specialized tool.

Also shown in FIG. 1 is extraction tool 18, which is one embodiment of a specialized tool that may be used to remove plug 16 from fastener 12. In the embodiment shown, extraction tool 18 includes an extraction head 30, an extraction tool shaft 34, a cylindrical receiving portion 36, and a conical portion 38 extending between conical receiving portion 36 and shaft 34. Cylindrical receiving portion 36 receives an end of a slide hammer assembly 40 into an opening 48 therein (best seen in FIG. 7). Slide hammer assembly 40 includes a slide bolt shaft 44 and a slide bolt head 42. A weight 46 is disposed on slide bolt shaft 44 and is able to slide along the length thereof.

Extraction head 30 of extraction tool 18 includes a flange 32 (best shown in FIG. 3) which, along with the walls of the extraction head 30, defines an interior space 24 therein. Interior space 24 is configured to receive head 20 of plug 16 therein. When head 20 is received within extraction head 30 of extraction tool 18, plug 16 can be removed from bolt 12 as described below.

FIG. 2 is a side view of a fully assembled system as described herein, including fastener 12 with plug 16 seated in the opening in the head thereof. Extraction tool 18 is shown with extraction head 30 engaging plug 16. When plug 16 is so engaged, the system may be used to remove plug 16 from fastener 12.

Also shown in FIG. 2 is engagement of extraction tool 18 by slide hammer assembly 40, and specifically by slide bolt shaft 44. It should be noted that slide bolt shaft 44 should be securely engaged with extraction tool 18. Any suitable engagement mechanism may be used. For example, slide bolt shaft 44 may include a locking member that is received into opening 48 of extraction tool 18 then locked into place by, for example, a quarter or half turn of slide bolt shaft 44. A weight 46 is shown slidingly engaged with slide bolt shaft 44, and slide bolt shaft 44 also includes a stop 42 at the end of the slide bolt shaft 44 opposite that which engages extraction tool 18.

FIG. 3 shows a close, detailed view of the intersection of bolt 12 and plug 16, as well as the intersection of extraction tool 18 and plug 16 when the extraction tool is used to grasp the plug. Body 21 of plug 16 is seated within the opening in the head 14 of bolt 12. A portion of body 21 is visible protruding from head 14 of bolt 12. Extending away from body 21 of plug 16 is shaft 28. At the opposite end of shaft 28 from body 21, head 20 of plug 16 is formed. Head 20 of plug 16 has a greater diameter than shaft 28 at the point at which the two meet, and this allows flange 32 of extraction head 30 to engage the rear, or bottom, surface of head 20 of plug 16. Extraction head 30 has an opening 24 therein so that extraction head 30 can slip over head 20 of plug 16 to allow the engagement of flange 32 with head 20. When so engaged, it can be seen that a sufficient pulling force exerted on extraction tool 18 will cause plug 16 to be removed from bolt 12.

Figure 4:
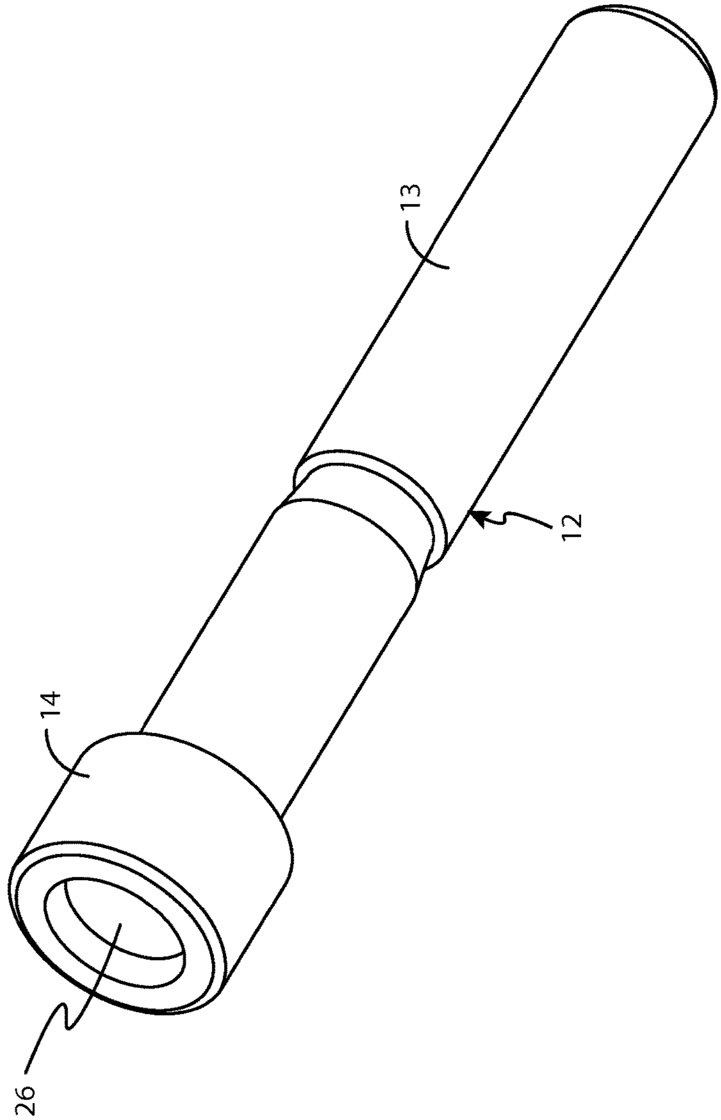
FIG. 4 is a perspective view of an exemplary bolt used with the present system.

FIG. 4 provides a perspective view of an exemplary bolt 12 that may be secured via the present device and system. Bolt 12 includes a shaft 13, a head 14, and an opening 26 within head 14. It is to be understood that bolt 12 may be any suitable fastener, regardless of size or shape. The three-dimensional profile of head 14, for example, may likewise assume any desired shape. Opening 26 within head 14 may be a standard sized and shaped opening that allows bolt 12 to be manipulated using ordinary tools, or may have a unique or unusual shape such that a special tool is needed to manipulate bolt 12. Body 21 of plug 16 may be securely seated within opening 26 of head 14 to present or restrict tampering with fastener 12.

Figure 5:
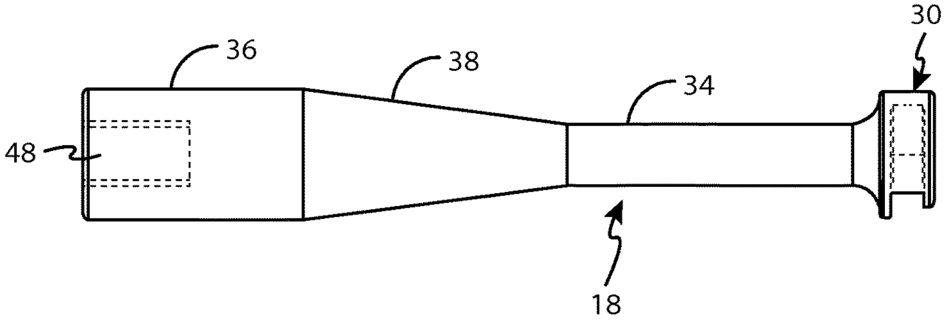
FIG. 5 is a first side view of an exemplary extraction tool of the present system.

FIG. 5 provides a side view of an extraction tool 18 for use as part of the present device and system. It is to be understood that the configuration of extraction tool 18 is an exemplary configuration, and that modifications may be made to the shape, size, and other configuration of extraction tool 18 as necessary or desirable for any given application. As can be seen in FIG. 5, extraction tool 18 includes an extraction head 30 at one end thereof. Shaft 34 extends away from extraction head 30 to conical portion 38, which increases in diameter until reaching cylindrical receiving portion 36. Cylindrical receiving portion 36 includes an opening 48 extending thereinto, and an end of slide bolt shaft 44 of slide hammer assembly 40 may be received within opening 48. FIG. 5 shows a first profile of extraction head 30, which engages plug 16 when the device is being used to remove plug 16 from fastener 12.

Figure 6:
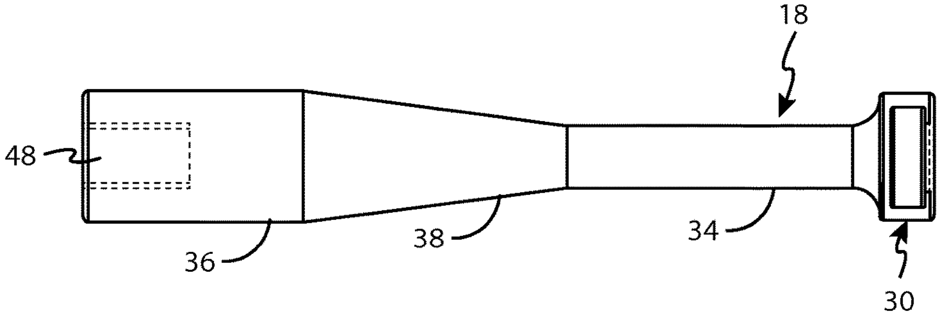
FIG. 6 is a second side view of an exemplary extraction tool of the present system.
Figure 7:
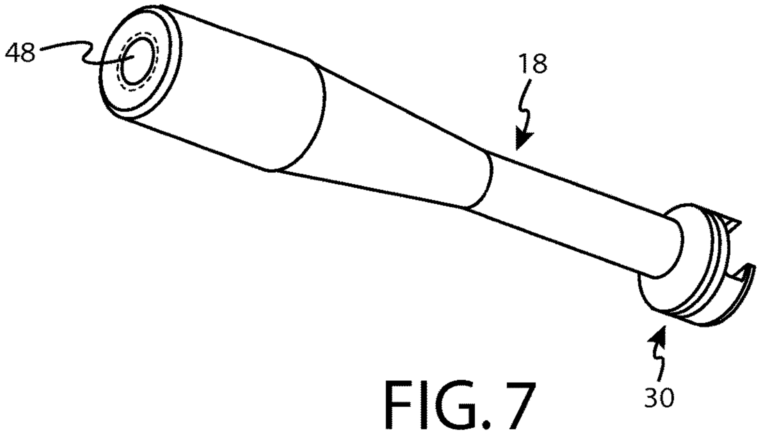
FIG. 7 is a perspective view of an exemplary extraction tool of the present system.

FIG. 6 is a side view of an extraction tool 18 of FIG. 5, but with extraction head 30 shown oriented at a different angle. FIG. 7 is a perspective view of the embodiment of extraction tool 18 shown in FIGS. 5 and 6. Opening 48 can be seen in an end of extraction tool 18. Further, a perspective view of extraction head 30 is also shown.

Figure 8:
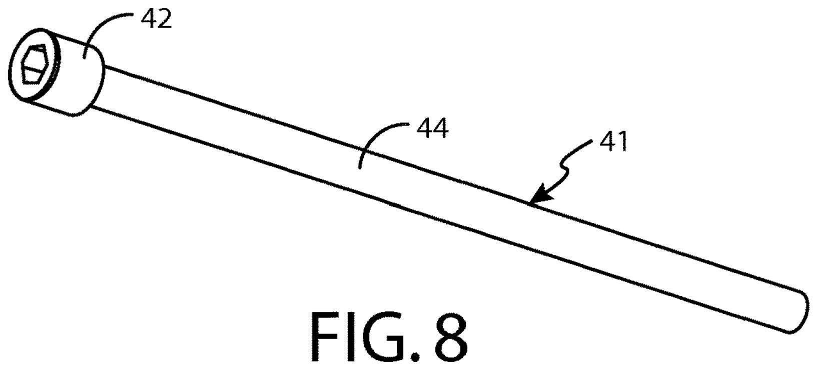
FIG. 8 is a perspective view of an exemplary sliding bolt of the present system.

FIG. 8 shows a perspective view of an exemplary slide bolt 41 suitable for use with the present device and system. Slide bolt 41 includes a slide bolt shaft 44 and a slide bolt head that serves as stop 42. An opening may be provided in stop 42, as shown, such that slide bolt 41 may be manipulated using a tool. It is contemplated that any size, shape or configuration of opening may be provided in stop 42, and that any suitable size, shape, or configuration of slide bolt 41 may be used.

Figure 9:
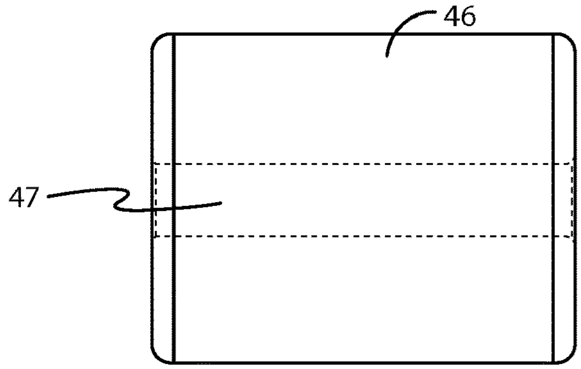
FIG. 9 is a side view of an exemplary slide hammer weight of the present system.
Figure 10:
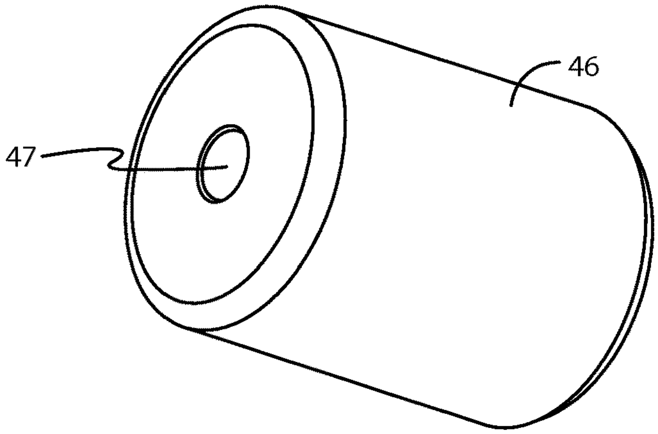
FIG. 10 is a perspective view of an exemplary slide hammer weight of the present system.

Slide bolt 41 is adapted to receive a weight 46 along its length. An exemplary embodiment of weight 46 is shown in FIGS. 9 and 10. FIG. 9 shows a side view of weight 46, whereas FIG. 10 shows a perspective view of weight 46. As shown, weight 46 includes a channel 47 extending through the length thereof. Channel 47 is configured to receive slide bolt shaft 44 of slide bolt 41 such that weight 46 may slide along the length of slide bolt 41. Although weight 46 is shown as cylindrical in FIGS. 9 and 10, it is contemplated that any suitable size or shape of weight 46 may be used. Likewise, the exterior surface of weight 46 may be knurled, smooth, or have any other pattern or configuration desired.

Figure 11:
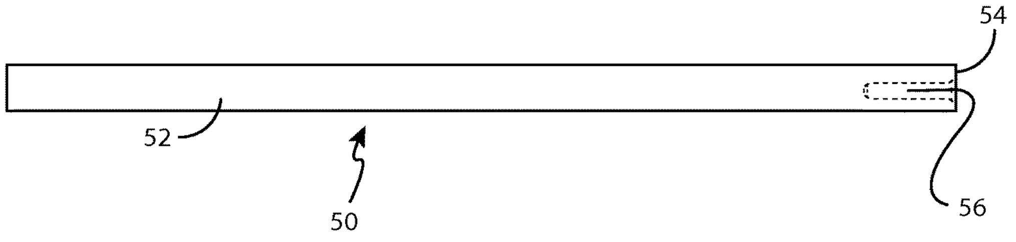
FIG. 11 is a side view of an exemplary insertion tool of the present system.

FIG. 11 depicts a side view of insertion tool 50 for delivering plug 16 to the head of a fastener used in a utility box or other fastened structure where the fastener to be protected is recessed or otherwise impossible to access without a long, thin tool. Insertion tool 50 includes a shaft 52 for gripping the insertion tool 50, a head portion 54, and an opening 56 in said head portion for receiving a magnet therein. With a magnet in place within opening 56, insertion tool 50 may retain a plug 16 on the end thereof, and plug 16 may be inserted into the opening in a fastener as described in greater detail below.

Figure 12:
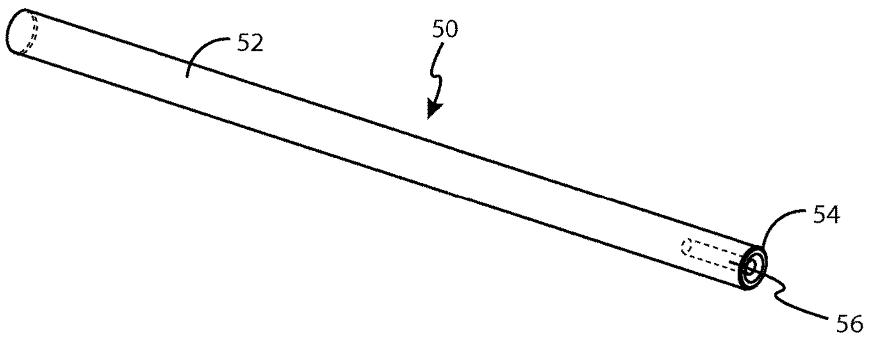
FIG. 12 is a perspective view of an exemplary insertion tool of the present system.

FIG. 12 is a perspective view of insertion tool 50, with head portion 54 thereof shown more clearly.

The present device and system may be used in conjunction with any suitable fastener, and in the description below, as well as in the drawings, bolt 12 is used for purposes of illustration and takes the place of any fastener that may be used for a given application. Use of the present device and system includes two basic tasks that may be performed: 1) securing a fastener; and 2) removing the secure structure (e.g. the plug) from a fastener so that the fastener may be manipulated in an authorized manner.

To secure a fastener such as bolt 12, a plug 16 is provided, with the body 21 of plug 16 being configured such that it can be received into opening 26 in head 14 of bolt 12. Opening 26 in head 14 of bolt 12 may have any of a variety of shapes, and the body of plug 16 will therefore require a complementary shape in order to be received therein. The appropriate plug 16 is held magnetically by insertion tool 50, with a magnet in the opening 56 of insertion tool 50 holding plug 16 in place while the insertion tool is used to position the body of plug 16 within opening 26 of head 14 of bolt 12, which for security reasons may not be accessible without a relatively long insertion tool 50. Once plug 16 is properly positioned within opening 26, a tap of a hammer or other tool on the end of insertion tool 50 can be used to securely set plug 16 within opening 26. Insertion tool 50 can then be removed without removing plug 16 from opening 26. If necessary or desired, a second tool such as a machined punch (not shown) may be used to drive plug 16 further into opening 26 so that plug 16 is held in its final, secure position. An insertion tool may also include a slide hammer to provide the force to firmly seat plug 16 within opening 26.

Plug 16 is removed from opening 26 using extraction tool 18 and slide hammer assembly 40. Extraction tool 18 is manipulated such that extraction head 30 of the tool slips over head 20 of plug 16, securing head 20 of plug 16 within interior space 24 of extraction head 30 and allowing flanges 32 to engage head 20 of plug 16. Once head 20 of plug 16 is securely held within extraction head 30 of removal tool 18, weight 46 is maneuvered along the length of slide bolt shaft 44 until it reaches stop 42. Thus positioned, weight 46 provides the necessary mass and leverage to allow a user of the extraction tool to pull plug 16 from opening 26 of bolt 12. In some instances, the force of weight 46 impacting stop 42 may be used to pull plug 16 from head 14 of bolt 12. With opening 26 of bolt 12 exposed, bolt 12 may be manipulated as normal. Once it is no longer desirable to manipulate bolt 12, and desirable to secure bolt 12 against unauthorized manipulation, plug 16 may be once again inserted into opening 26 as described above, thereby rendering bolt 12 incapable of being manipulated in the usual manner.

Figure 13:
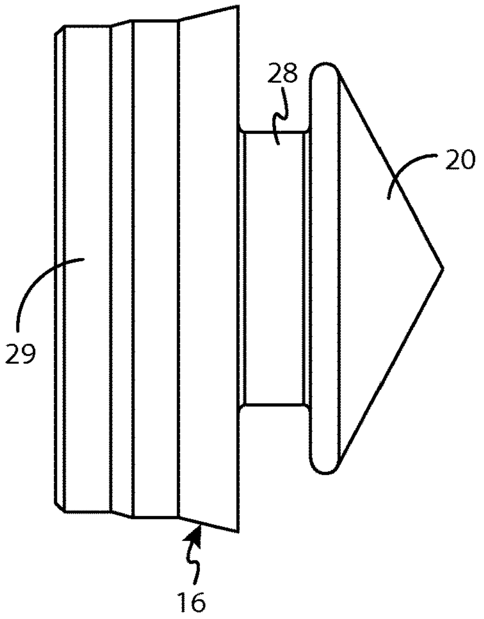
FIG. 13 is a side view of an exemplary plug of the present system.
Figure 14:
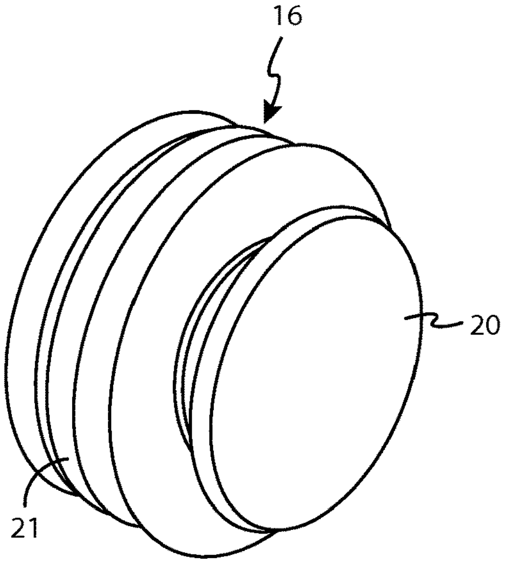
FIG. 14 is a perspective view of an exemplary plug of the present system.

FIGS. 13 and 14 provide views of an exemplary plug 16 suitable for use with the present invention. As shown, plug 16 includes a body 21 configured to be received within an opening in the head of a suitable fastener. A head 20 is provided with a sloping profile, making the plug difficult to manipulate when in place within a fastener. A shaft extends between the hand 20 and body 21 of plug 16, and head 20 has a larger diameter than shaft 28 of plug 16 at the point where the two meet. This configuration allows the extraction tool 18 to firmly grip plug 16. FIG. 14 shows a perspective view of the embodiment of plug 16 shown in FIG. 13.

The figures provided herewith, and the foregoing description, are drawn primarily to an exemplary embodiment of the present device and system. It is to be understood that any size, shape, or configuration of the various elements of the present device and system described above may be utilized, including any of a variety of lengths of bolt, insertion tool, or extraction tool. For some uses, wherein the bolt or other fastener to be secured is more easily manipulated, a user may be able to accomplish the insertion and removal of the plug with shorter tools, while in other cases where the fastener to be secured is recessed or otherwise hidden away from ready manipulation, a user may require a different length of extraction or insertion tool, or may require tools having shapes other than the straight configuration shown in the drawings.

In some configurations of the device, the various components thereof may be present in a single tool. For example, the extraction tool and slide hammer assembly may be provided as a single tool. In some configurations, the insertion tool may also be provided as part of a single tool combined with either, or both, of the extraction tool and slide hammer assembly. For example, a dual-sided tool may be provided, with an insertion tool at one end and an extraction tool at the other. In some configurations, a slide hammer assembly may be provided between both ends, so that the force of the slide hammer assembly may be used to both insert and remove the plug. In addition, while stop 42 of slide hammer assembly 40 is shown as a fixed piece of slide hammer assembly 40, it is contemplated that a removeable stop 42, such as a nut that may be screwed onto or off of shaft 44, may also be used. Various modifications to what is disclosed will be readily apparent to those of skill in the art upon reading this disclosure.

All such modifications are considered to be within the spirit and scope of the present device and system.

The invention claimed is:

1. A system for securing a fastener against unwanted tampering, the system comprising:

a plug configured to engage the head of a fastener to be secured and to be retained by said fastener while said fastener is in operable position fastening a first object to a second object, the plug having an external profile;

an extraction tool comprising a first end and a second end, the first end of the extraction tool comprises a hollow head comprising a first slot in a portion of a sidewall thereof and is configured to mate with the external profile of the plug in such a manner as to allow the extraction tool to exert a pulling force on the plug, and further wherein the second end comprises a second slot configured to receive a slide hammer assembly; and a slide hammer assembly removably attached to the second end of the extraction tool, the slide hammer assembly comprising a slide bolt having a shaft and a stop at a first end thereof, and a weight slidingly disposed on said shaft, wherein movement of the weight along the slide bolt shaft and impacting the stop thereof creates a force on said slide hammer shaft and said extraction tool, thereby pulling said plug from engagement with said fastener, wherein when the plug is retained in said fastener, said fastener cannot be removed from said operable position by the usual means for removing said fastener.

2. The system according to claim 1 wherein the plug comprises a head, a base, and a shaft extending between the head and base, the base of said plug configured to be received within an opening in said fastener, the shaft of the plug having a diameter smaller than that of the head of the plug at the point where the head of the plug and the shaft of the plug meet.

3. The system according to claim 2, wherein the head of the plug has a sloping profile.

4. The system according to claim 2, wherein the first end of the extraction tool comprises an extraction head, the extraction head comprising an opening sized and shaped to receive the head of the plug, the extraction head further comprising a flange configured to securely engage the head of the plug such that a pulling force exerted on the extraction tool results in a corresponding pulling force on the plug.

5. The system according to claim 1, wherein the extraction tool and slide hammer assembly are a single, unitary tool.

6. A system for securing a fastener against unwanted tampering, the system comprising:

a plug configured to be received by a fastener to be secured and to be retained by said fastener while said fastener is in operable position fastening a first object to a second object;

an extraction tool having a first end, a second end, and a shaft extending between the first end and second end, the first end of the extraction tool comprising a first slot in a side wall thereof and an extraction head configured to engage said plug, and the second end of said extraction tool comprising a stop; and a weight slidingly disposed on the shaft of the extraction tool, wherein when the plug is retained in said fastener, said fastener cannot be removed from said operable position by the usual means for removing said fastener.

7. The system according to claim 6, wherein the extraction tool comprises:

a first portion; and a second portion removably attached to the first portion, the first portion of the extraction tool comprising the extraction head and the second portion of the extraction tool comprising the weight disposed on the shaft of the extraction tool.

8. The system according to claim 6, wherein the plug comprises:

a head;

a body; and a shaft extending between the head and the body, the head having a diameter greater than the diameter of the shaft at the point where the head and shaft meet.

9. The system according to claim 8, wherein the head of the plug has a sloping profile.

10. The system according to claim 8, wherein the extraction head comprises a flange configured to engage a rear of the head of the plug when the extraction head is engaged with the plug.

* * * * *